United States Patent
Kosmidis

[11] Patent Number: 6,114,944
[45] Date of Patent: Sep. 5, 2000

[54] REMOTE CONTROL FOR AUDIO AND VIDEO ELECTRONIC APPLIANCES

[76] Inventor: Ioannis Kosmidis, 21 Fillow St., Norwalk, Conn. 06850

[21] Appl. No.: 09/265,739

[22] Filed: Mar. 10, 1999

[51] Int. Cl.[7] .................................................. H01L 10/50
[52] U.S. Cl. ........................................... 338/200; 338/172
[58] Field of Search ..................................... 338/138, 172, 338/179, 200, 201

[56] References Cited

U.S. PATENT DOCUMENTS

| | | | |
|---|---|---|---|
| 2,350,277 | 5/1944 | Grimes | 338/179 |
| 2,384,195 | 9/1945 | Puleo et al. | 338/179 |
| 2,815,444 | 12/1957 | Messner . | |
| 2,907,217 | 10/1959 | Siegel . | |
| 3,317,877 | 5/1967 | Matsumoto | 338/138 |
| 3,375,446 | 3/1968 | Guyton | 338/179 |
| 3,743,976 | 7/1973 | Meyer et al. | 338/200 |
| 3,768,019 | 10/1973 | Podowski . | |
| 3,792,387 | 2/1974 | Arrington et al. | 338/200 |
| 3,840,838 | 10/1974 | Tanaka et al. | 338/198 |
| 4,206,334 | 6/1980 | LaRock . | |
| 4,375,651 | 3/1983 | Templin et al. . | |
| 4,465,994 | 8/1984 | Rehberger . | |
| 4,520,306 | 5/1985 | Kirby | 338/200 |
| 4,633,521 | 12/1986 | Liautaud . | |
| 4,724,286 | 2/1988 | Cummins | 338/200 |
| 4,878,154 | 10/1989 | Wang | 338/200 |
| 5,068,639 | 11/1991 | Swanson et al. | 338/179 |
| 5,408,275 | 4/1995 | Song et al. . | |
| 5,726,649 | 3/1998 | Tamaru et al. . | |

*Primary Examiner*—Michael L. Gellner
*Assistant Examiner*—Karl Easthom
*Attorney, Agent, or Firm*—St. Onge Steward Johnston & Reens LLC

[57] ABSTRACT

A remote control device has a compartment enclosed by a housing and receiving a printed board that carries a potentiometer for controlling the volume of sound of an electronic sound device and a switch for deactivating a selected playing selection. The remote control device is further provided with a plurality of coupling elements connecting the printed board to the housing and with a multi-wire cable connecting the potentiometer and push switch to an audio circuit and a selection control circuit of the electronic sound device.

10 Claims, 2 Drawing Sheets

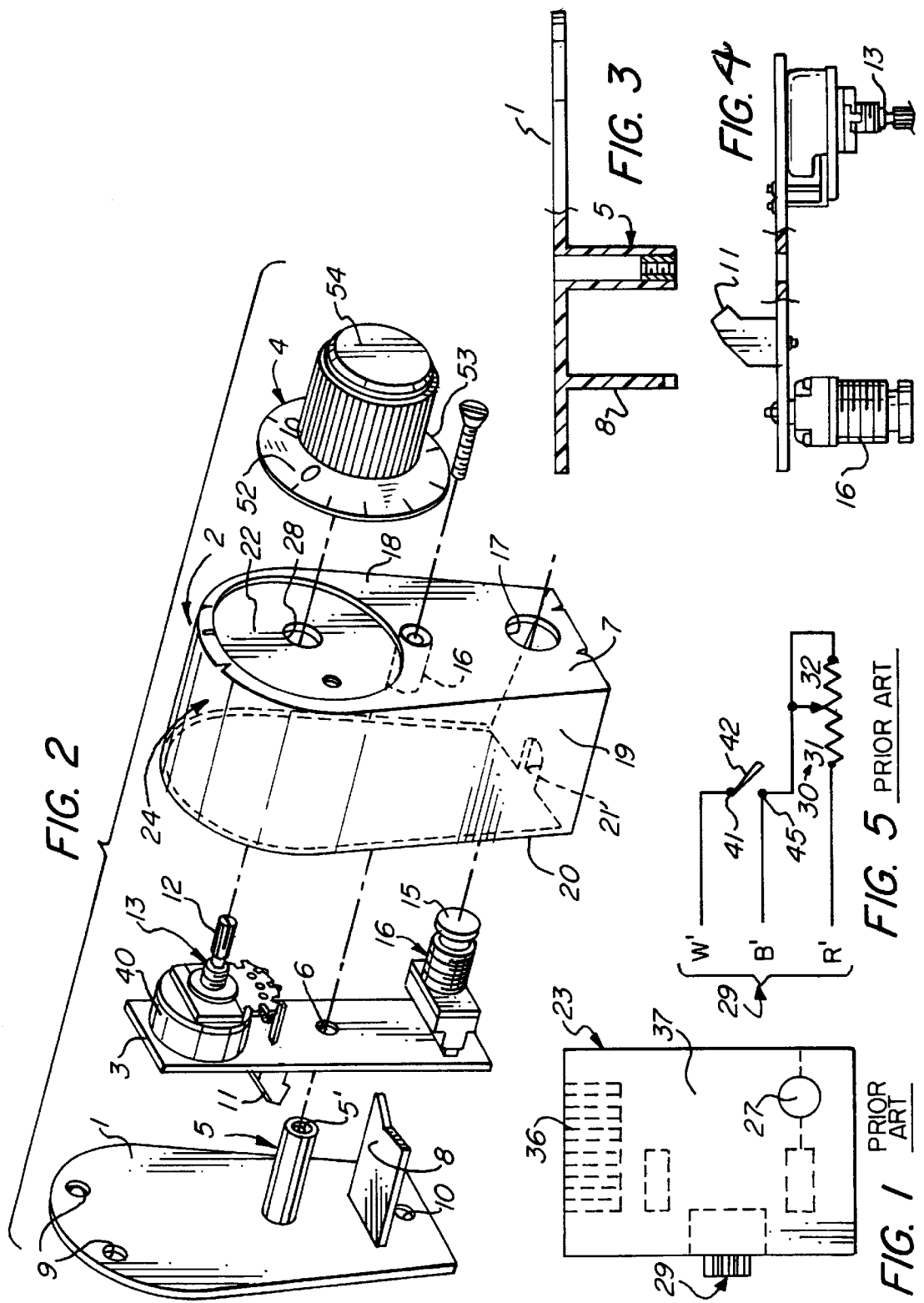

6,114,944

REMOTE CONTROL FOR AUDIO AND VIDEO ELECTRONIC APPLIANCES

FIELD OF THE INVENTION

The present invention relates to a remote control device used for controlling an electronic sound device, and more particularly to a wired remote control device for adjusting the volume of sound of the electronic sound device and for deactivating a selected music or video piece.

BACKGROUND OF THE INVENTION

The increasing amount of audio and video appliances in such public places as bars, restaurants, diners, and the like has posed a problem of excessive noise that can be bothersome to a majority of guests and detrimental to an effective operation of such public places. Quite often, a guest literally occupies a juke box or a video apparatus and keeps playing the same musical or video selection for a prolonged period of time to the exclusion of the rest of guests. Furthermore, a situation may arise when a selection that is currently being played should be immediately interrupted as a result of exigent circumstances. The above described reasons and many others necessitate the desirability for conveniently modifying an otherwise manually operated juke box or video apparatus so as to provide for a remote control unit to control the volume of sound and to interrupt a currently playing selection. A remote location may be selected in accordance with needs and wishes of a particular person, for example, a bartender or a cashier who is responsible for supervising a public place. In addition, the internal modification of the juke box itself should be held to a minimum or not take place at all.

Typically, a wired remote control for a sound device operates at a remote location to control the volume of sound. For example, U.S. Pat. No. 2,907,217 discloses a wired volume remote system for selecting a channel selection and controlling the volume of sound of a television receiver. A volume control knob is used to control the resistance of a rheostat in the remote system.

U.S. Pat. No. 2,815,994 discloses another wired remote control apparatus for use with a television receiver. Similar to the remote control of U.S. Pat. No. 2,907,217, this apparatus employs a conventional volume control.

None of the above-described remote controls is particularly useful for overcoming the problems associated with the juke box. Particularly, the known wired remote controls cannot interrupt a selection without totally deenergizing the electronic sound device.

SUMMARY OF THE INVENTION

It is the principal object of the present invention to provide an improved remote control for audio appliances in which the aforedescribed drawbacks of the known prior art are obviated.

Another object of the present invention is to provide an improved remote control that can be used with existing audio and video appliances.

Still another object of the invention is to provide an improved remote control that can be easily installed and economically manufactured.

In its most general sense, the invention provides, in attaining the aforedescribed objects, for an audio appliance and, more particularly, for a juke box, provided with a selection control circuit and an audio control circuit that includes at least one speaker. The remote control has a housing spaced at a distance from the juke box and, at least partly enclosing an interior space, a printed circuit mounted on the housing and carrying a potentiometer and a switch that disables the control selection circuit, and means including a cable for connecting the selection control and audio circuits of the juke box to the switch and potentiometer respectively.

The invention is, therefore, a simple remote control device capable both of regulating the volume of sound at any convenient location that is remote from the juke box, and, if necessary, of interrupting a selection made by a user of the juke box. Typically, the juke box has a front panel that is formed with a selection menu having a plurality of buttons which correspond to the titles of music pieces. The remote control device can also be used with a karaoke apparatus that is known to have a display unit for showing the title of a music piece, and a rotatable control knob for selecting music. Placing the potentiometer and push switch in one housing spaced from the juke box allows a designated person to effectively control audio appliances in response to either a public request or his/her personal judgment without wasting any time.

Critical to the present invention is the fact that the juke box or any other audio appliance does not need to be significantly rewired. An electrical connector can be easily attached to volume and selection regulators that are usually mounted on the juke box. The connector is a multi-wire cable and can have at least two wires.

As is known, cables carrying two or three wires are easily commercially available. In case of a two-wire cable, it would be necessary to use two such cables.

Advantageously, a three-wire cable is used in conjunction with a three-leg printed board. The board carries a multi-port wire block that is also commercially available. The wire block has a simple screw connection that is perfectly suitable for commercial cables with 10, 12, or 14 wire. However, other types of wire connections (such as spring-biased connections) can likewise be easily utilized in the present invention.

The printed board also carries an adjustable potentiometer and a oneposition push switch. Advantageously, the potentiometer is of a rotary type and has a tapered resistance characteristic. The "tapered" potentiometer is characterized by a wide regulating range. Alternatively, it is possible to implement a helipot potentiometer that has the regulating range of the volume of sound greater than that one of the "tapered" potentiometer. Instead of the rotary-type potentiometer described above, a linear potentiometer can be used in order to successfully carry out the present invention. Eventually, esthetic and regulating range requirements will dictate what type of a potentiometer is to be used.

According to the invention, the push switch has to immediately disable a playing selection in response to exigent circumstances. Based on this premise, a one-position switch, such as, for example, a toggle switch, that provides a momentary contact can be utilized for disconnecting purposes. It is also possible to use a two-position switch, but the latter may not be practical for purposes of this invention.

The printed board, potentiometer, and push switch are housed in a casing of the remote control. The shape of the casing may vary. In general, the casing includes a wall-mount plate that can be attached to any vertical or horizontal surface. The plate, in turn, is provided with a plurality of openings for receiving fasteners. A fastener can be selected from the group consisting of pins, screws, bolts and the like. It is possible, instead of the above-listed fasteners, simply provide a plurality of hooks which are molded with the plate that can be mounted on a vertical surface. The casing further includes a front housing part that is formed with a plurality of openings receiving shafts of the potentiometer and push switch. Such indicia as "volume" and "cancel" are conspicuously placed on a front face of the housing next to the shafts of the potentiometer sand push switch respectively. Either the wall plate or the housing of the casing is formed with a peripheral wall extending therebetween in the assembled state of the casing. In order for the multi-wire cable to reach an interior of the casing, the peripheral wall is recessed.

Both the plate and the housing are formed unitarily with respective open-ended sleeves extending coaxially toward each other during assembly of the casing. The sleeves and an opening made in the printed board form a channel that is traversed by a coupler releasably connecting all three parts together. Similar to the fasteners, which attach the wall-mount plate to the surface, the coupler is selected from the group consisting of bolts, screws, pins, or the like. At least one of the sleeves may be formed with an inner screwthreaded surface engaging a respective screwthread that is provided on the coupling element.

The casing is made of insulating non-flammable or self-extinguishing material. Elements supporting the printed circuit in the assembled state of the casing may be formed on the wall-mount plate and extend toward the printed circuit. Such structure provides a reliable and stable position of the printed circuit when the user uses the push switch.

BRIEF DESCRIPTION OF THE DRAWINGS

The above and other objects, features, and advantages of the present invention will become more readily apparent from the following description taken in conjunction with the accompanying drawings, in which:

FIG. 1 is a diagrammatic view of the present invention illustrating a juke box;

FIG. 2 is an exploded view of a remote control according to the invention;

FIG. 3 is a sectional view of a bottom of a housing of the remote control shown in FIG. 2;

FIG. 4 is a sectional view of a printed circuit carrying a push switch and a potentiometer of the remote control shown in FIG. 2;

FIG. 5 is a standard printed board utilized in the remote control of FIG. 2;

FIG. 8 is a perspective view of of one of the embodiments of the remote control shown in FIG. 2; and.

DETAILED DESCRIPTION OF THE INVENTION

Figure 7:
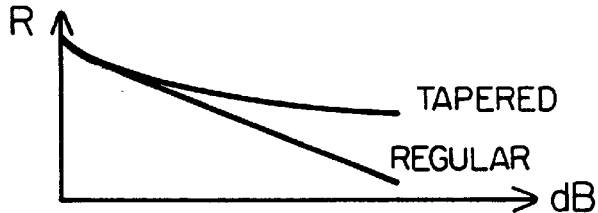

Generally, an assembled remote control according to the invention is shown in FIG. 7 and has a housing formed with a flat bottom and an arcuate top which bridges a pair of side walls and is spaced from the bottom. Understandably, both, the top and bottom of the housing, can be designed to have different shapes. In the embodiment illustrated in FIG. 7, side walls converge toward the bottom. However, the side walls can diverge toward the bottom or extend parallel to one another and be outwardly or inwardly concave. A face side of the housing carries a volume button provided with a respective volume scale and a resent push button for immediate cancellation of a selection of the a selection control circuit.

Figure 8:
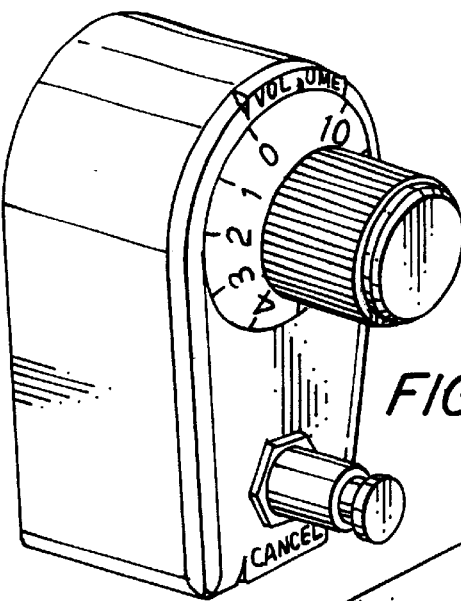
Figure 9:
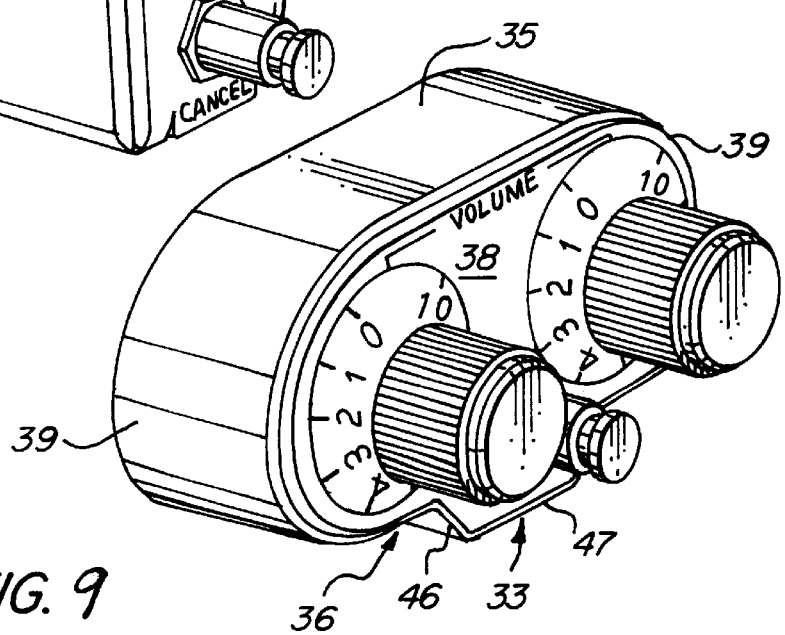
FIG. 9 is a perspective view of another embodiment of the remote control shown in FIG. 2.

Another embodiment of the assembled remote control according to the invention is illustrated in FIG. 8 and includes a housing which is unitarily formed with outwardly arcuate side walls 39 having the same radius and bridged by a top 35 and by a bottom 36. A front face 38 carries a pair of spaced apart volume buttons 44, each of which is formed in close proximity to a respective one of side wall 39. A reset push button 40 is equidistantly spaced from knobs 44 and lies somewhat below the latter in a symmetry plane of housing 2. Finally, bottom 36 is formed with a centrally positioned flange 33 that has a shape of frustum of a cone or pyramid. Particularly, flange 33 has a pair of downwardly tapering side walls 46 which, in turn, are bridged by a flange bottom 47 extending parallel to the bottom 36 and top 35 of housing 2. Understandably, flange 33 can be easily designed to have shapes that are different from the one described above.

As shown in FIG. 1, a standard juke box 23 has a front panel 37 that is formed with a selection menu 36 usually having a plurality of buttons which correspond to the titles of music pieces. Juke box 23 is further provided with a selection control circuit 25 that carries out a selection made by a user of juke box 23. Control circuit 25 energizes various mechanisms delivering the selection to a playing station in juke box 23. As a standard feature, an audio circuit 26 generates an output sound signal via a speaker 27.

FIG. 5 illustrates a known control circuit for controlling the sound of volume of the juke box shown in FIG. 1. At least one connector 29 running from juke box 23 to a remote control 30 is an electrical multi-wire cord that may vary in length and number of conductors in order to meet various requirements of a particular place. In the preferred embodiment illustrated in the drawings, connector 29 has three wires W, B and R that are electrically connected to selection control circuit 25 and audio circuit 26.

Figure 6:
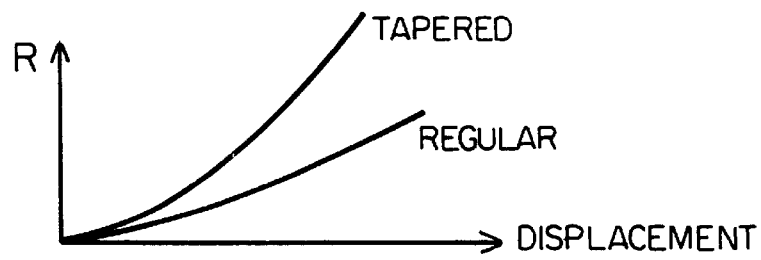
FIGS. 6 and 7 are graphs showing characteristics of a tapered potentiometer and a standard one utilized in the remote control shown in FIG. 2.

A standard printed circuit board 3 (FIG. 2) of remote control 30 is utilized in the invention and is schematically shown in FIG. 2 having three legs W', B' and R' that are electrically connected to respective wires W, B and R of connector 29 (FIG. 1) by means of a three-port wire block 11, as illustrated in FIGS. 2 and 6.

Board 3, according to the invention, further carries a push switch 16 and a potentiometer 13 (FIGS. 2 and 4). As mentioned above, all of the elements that are described in this text are standard and commercially available.

Potentiometer 13, having a tapered resistance characteristic according to the preferred embodiment, is provided with a knob 4 (FIG. 2) mounted detachably on a rheostat shaft 12 and translating a rotary motion to rheostat shaft 12. Knob 4 is provided with a volume scale 52 clearly visible in FIG. 2. While rotating, shaft 12 controllably modifies the resistance of a rheostat 40 which has terminals 31 and 32 that are connected through legs B' and W', three-port connector 11, and wires B and W to the voice coil of speaker 27 of juke box 23.

Referring to FIG. 6, the potentiometer with the tapered resistance characteristics has a range of regulation of an output signal greater than that one of the regular potentiometer. FIG. 6 illustrates a resistance R of the "tapered" potentiometer that changes exponentially in response to displacement of knob 4. In contrast, in a regular potentiometer, resistance R is a linear function of displacement of a control rotary knob.

FIG. 7 shows a graph on which resistance R is plotted against volume dB. Similar to FIG. 5, resistance of the regular potentiometer changes linearly in response to increase of volume. In contrast, resistance of the "tapered" potentiometer deviates from the linear characteristics of the regular potentiometer, thus providing a broad range within which the volume of jukebox 23 can be regulated.

Advantageously, a helipot potentiometer, which has the broadest regulating range, can be used instead of the "tapered" potentiometer.

Although above-described potentiometer 13 is rotary, a linear potentiometer can be easily implemented within the scope of the present invention.

In the preferred embodiment, push switch 16 is a one-position switch and includes a switch shaft 14 (FIG. 2) which is linearly movable between "on" and "off" positions in response to a pressure applied by the user to a push button 15 (FIG. 2). As is illustrated in FIG. 5, push switch 16 is formed with a normally open contact 42 bridging terminals 41 and 43 of legs R' and B' in response to depression of push button 15. As a result of the closing of contact 42, selection-control circuit 25 is immediately de-energized, and the selection that has been chosen by the user stops playing. Consequently, disabling of a selection of the selection of the control circuit occurs without disabling power to the energized electronic equipment and without simultaneously changing to another selection.

As shown in FIG. 2, the preferred embodiment of remote control 23 includes a wall-mount plate 1 made of insulating material. Thoroughgoing openings 9, 10 facilitate mounting of plate 1 on any surface, including a wall, that is conveniently located at a distance from juke box 23. A number and location of openings 9, 10 on wall-mount plate 1 can vary according to the user's needs. An elongated sleeve 5 extends along an axis 5' and is located in a central region of plate 1. Although sleeve 5 can be formed anywhere on plate 5, the central location is preferable. An end of sleeve 5 that is distant from plate 1 is formed with an inner screwthread 34 for the reasons to be explained below. Plate 1 also carries a supporting tongue 8 that is spaced from sleeve 5 and extends in a plane parallel to sleeve 5. Sleeve 5 and tongue 8 are integrally formed with plate 1.

As explained above, wire block 11 (FIGS. 2, 4) is provided on a side of printed board 3 that faces wall mount plate 1 during assembly of remote control 30. Push switch 16 and potentiometer 13 are provided on the other side of printed board 3 and flank an opening 6 that is coaxial with sleeve 5 during assembly of remote control 30.

A housing 2 is formed with a peripheral wall 19 that extends between an edge 19' and a front wall 18. Edge 19', in turn, is provided with a seat 20 that receives wall-mount plate 1. As a result, plate 1 is flushed with peripheral edge 19', thus forming a housing flat back wall. Peripheral wall 19 is also formed with a slit 21 through which connector 29 reaches the interior of housing 2.

Front wall 18 of housing 2 is formed with a depression 22 surrounding a center opening 28 that receives an outer end of rheostat shaft 12 projecting beyond front wall 18. Switch shaft 14 and push button 15 extend though an opening 17 that is spaced from depression 22 on front wall 18 of housing 2, as illustrated in FIG. 2.

An inner side of front wall 18 is unitarily formed with another elongated sleeve 16 positioned coaxially with sleeve 5 and opening 6 and extending toward printed circuit board 3 during assembly of remote control 30. One end of sleeve 16 opens into front wall 18. As a result of such design, sleeves 5 and 16 and opening 6 form a throughgoing channel that receives a fastening element reliably interconnecting wall-mount plate 1, printed board 3, and housing 2 together. The fastening element can be a pin formed with a screwthread, a bolt, or a screw. Thus, printed board 3 is reliably mounted on housing 2. Supporting tongue 8 is formed with a distant dove-tail end receiving connector 29 and pressing it directly against printed board. As a result, the housing provides an integral strain relief for connector 29. Control knob 4 is formed with an elongated sleeve 54 mounted tightly on the outer end of rheostat shaft 12 and a radial plate 53 that extends radially outwardly from the elongated sleeve and is lodged in depression 22. Radial plate 53 is formed with scale 52 indicating a level of volume, as is mentioned above. Finally, front wall 18 of housing 2 has indicia "volume" located next to the radial plate and "cancel" conveniently placed next to push button 15 of push switch 13.

Another embodiment of remote control 30 that provides a possibility of regulating the volume of sound of a plurality of audio and video devices in a public place can be seen in FIG. 8. A circuit board can be modified to accommodate as many legs as necessary in order to electrically connect a plurality of potentiometers 13 to respective audio and video devices.

Although the preferred embodiments of the present invention have been disclosed for illustrative purposes, those skilled in the art will appreciate that various modifications, additions and substitutions are possible, without departing from the scope of the invention as recited in the accompanying claims.

What is claimed is:

1. A remote control and electronic equipment combination comprising:
   a piece of electrically energized electronic equipment provided with an audio circuit and a selection control circuit;
   a housing mountable on a surface spaced at a distance from the electronic equipment;
   at least one adjustable potentiometer on said housing for controllably regulating the volume of sound of the electronic equipment;
   at least one push switch on said housing for disabling a selection of the selection control circuit without disabling power to the energized electronic equipment and without simultaneously changing to another selection;
   an elongated multi-wire connector extending between the electronic equipment and the housing;
   a wire block connecting said multi-wire connector to said printed board in said housing; and
   circuit means mounted on said housing for connecting said potentiometer to the audio circuit and for connecting the switch to the selection control circuit of the electronic equipment, said circuit means including:
      a printed circuit board carrying said potentiometer and said switch, said printed circuit board being a three-leg circuit, each of the legs being electrically connected to a respective wire of said multi-wire connector through said wire block, a first leg of aid printed circuit board being connected to said push switch, the second and third legs being connected to said potentiometer, said switch being formed with a normally-open contact bridging said first and second legs of the three-leg circuit upon application of an extraneous pressure to said switch.

2. The remote control and electronic equipment combination defined in claim 1 wherein said housing is formed with:

a bottom, a front cover formed with a plurality of openings, and a peripheral wall extending between said bottom and front cover upon assembling said housing, said printed circuit board being mounted on said housing between said front cover and said bottom.

3. The remote control and electronic equipment combination defined in claim 2 wherein said peripheral wall is formed unitarily with said front cover and has a peripheral edge provided with a seat facing the bottom, each of said bottom and front cover being formed with a respective hollow sleeve extending along a respective axis, said sleeves extending inwardly toward each other upon assembling said housing, said printed circuit being formed with a respective opening coaxial with said sleeves and forming therewith an axial passage which opens at opposite ends thereof into said bottom and said front cover respectively upon lodging said bottom in said seat of the peripheral edge.

4. The remote control and electronic equipment combination defined in claim 3 wherein said axial passage receives attaching means for releasably interconnecting said bottom, said printed circuit, and said front cover of said housing.

5. The remote control and electronic equipment combination defined in claim 4 wherein said attaching means includes a pin formed with a screwthread engaging a respective screwthread formed in at least one of said sleeves.

6. The remote control and electronic equipment combination defined in claim 2 wherein said bottom is a wall-mount plate formed with means for mounting said housing in the surface.

7. The remote control and electronic equipment combination defined in claim 1 wherein said potentiometer has a tapered resistance characteristic.

8. The remote control and electronic equipment combination defined in claim 3 wherein said potentiometer includes:

a shaft rotatable about a shaft axis and having a remote end which extends through one of said plurality of openings of the front wall and terminates at a distance therefrom; and a volume indicator mounted on said remote end of said shaft and rotatably fixed therewith.

9. The remote control and electronic equipment combination defined in claim 1 wherein said switch is a push switch formed with a respective shaft extending through a respective opening of said plurality of openings of the front cover and terminating at a distance therefrom and receiving a push button.

10. The remote control and electronic equipment combination defined in claim 1, further comprising another adjustable potentiometer on said housing and another switch for disabling a selection of the selection control circuit, said housing being formed unitarily with a central flange extending outward the bottom of the housing.

* * * * *